United States Patent Office 3,164,631
Patented Jan. 5, 1965

3,164,631
SODIUM SALTS OF CHLORINATED $C_{19}$-α-ALKYL-DICARBOXYLIC ACIDS
Hans Feichtinger, Dinslaken, and Hans-Joachim Tomuschat, Oberhausen-Sterkrade-Nord, Germany, assignors to Ruhrchemie Aktiengesellschaft, Oberhausen-Holten, Germany, a German corporation
No Drawing. Filed Sept. 2, 1959, Ser. No. 837,590
Claims priority, application Germany Sept. 6, 1958
1 Claim. (Cl. 260—514)

This invention relates to an improved process for the production of chlorinated dicarboxylic acids.

An object of this invention is the provision of an efficient and economical process for the production of chlorinated dicarboxylic acids.

Another object of this invention is to provide a process which is adapted to be employed in the preparation of chlorinated dicarboxylic acids, which process comprises reacting a dicarboxylic acid with chlorine in the presence of a solvent inert with respect to the chlorine.

Various other objects and advantages will be apparent as the nature of the invention is more fully disclosed.

Chlorinated aliphatic dicarboxylic acids have previously been prepared by chlorination in the absence of any solvent of their corresponding dichlorides, dinitriles or dimethyl esters. The chlorinated dichlorides, dinitriles or dimethyl esters are in turn reacted in the conventional manner to produce the desired dicarboxylic acids. The chlorinated dicarboxylic acids can also be prepared by addition of chlorine or hydrogen chloride to the olefinic or acetylenic free bonds present in the starting dicarboxylic acid.

It has now been found that straight-chain, branched-chain and cycloaliphatic free dicarboxylic acids may easily be chlorinated if the same are dissolved or suspended in a solvent stable to chlorine. When the chlorination is effected in this manner, the carbon structure of the dicarboxylic acid is not altered, and the two carboxylic acid groups are maintained unaltered.

The chlorination takes place even at normal temperatures and pressures, but higher temperatures may advantageously be used. The chlorination takes place even at room temperature, but may be accelerated by heating, for example, to the boiling point of the solvent mixture.

The dicarboxylic acids, which may be chlorinated in accordance with the invention, contain at least 3 carbon atoms in their molecules and include, for example, adipic acid, nonadecandioic acid, α-tetradecylglutaric acid, cetylmalonic acid, tricyclodecane - (5,2,1,0$^{2.6}$) - dicarboxylic acid-(4,8), as well as both the solid and liquid terpane-dicarboxylic acids, which are prepared according to British patent specification No. 766,913. $C_{19}$-α-alkyldicarboxylic acid mixtures of the general formula

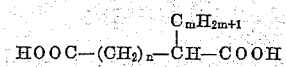

such as are obtained by hydroformylation of technical oleic acid, hydrogenation of the hydroformylation product followed by alkali fusion, which are prepared according to French patent specification No. 1,189,133, may easily be chlorinated in accordance with the invention. The $C_{19}$-α-alkyldicarboxylic acid is most conveniently chlorinated employing carbontetrachloride as solvent and by passing in gaseous chlorine while irradiating with ultraviolet light. When dicarboxylic acids are to be chlorinated, which are only difficulty soluble or substantially insoluble in the solvent, then the chlorination is carried out with the acid suspended in the solvent.

Chlorination in accordance with the invention comprises the treatment in solvents stable, i.e. inert to chlorine or dicarboxylic acids, with gaseous chlorine without or in the presence of catalysts at normal or elevated temperatures. The method according to the invention may be carried out employing dicarboxylic acids having a sufficiently large carbon structure to take up at the time the amount of chlorine desired. The chlorination according to the invention is especially adapted for the chlorination of dicarboxylic acids of the type HOOC—A—COOH, wherein A is a straight-chain or branched-chain aliphatic or cycloaliphatic hydrocarbon radical. Thus, for example, dicarboxylic acids of the general formula

may be employed as starting materials, wherein $n$ may have a value of at least 4. These acids are homologues of the non-branched α,ω-dicarboxylic acids having 6 or more carbon atoms in their molecules. Any branched-chain dicarboxylic acid having 6 or more carbon atoms in its molecule may be chlorinated according to the invention. Such acids are exemplified by decylmalonic acid, tetradecylglutaric acid, α-propyl-adipic acid, α-methyl-pentadecandioic acid and dicarboxylic acids having similar structures. Cycloaliphatic dicarboxylic acids of the following general formula may also be chlorinated in accordance with the invention:

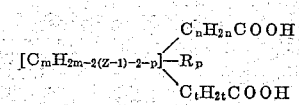

wherein $m$ represents the number of carbon atoms contained in the ring system and Z represents the number of rings present in the molecule, whereby Z is a whole number which must at least have the value of 1. R represents the same or different alkyl radicals present in the ring, their number amounting to $p$, whereby $p$ represents a whole number or zero and $n$ and $t$ represent whole numbers but may also have the value of zero.

Included within the above general formula are, for example, tricyclodecane-(5,2,1,0$^{2.6}$)-dicarboxylic acid-(4,8), α,α-hexamethylene sebacic acid, cyclohexane-diacetic acid-(1,2), terpanedicarboxylic acids and dicarboxylic acids of similar structure. The acids may be chlorinated as single acids or as mixtures of these acids.

Chlorination according to the invention is effected after dissolving or suspending the free dicarboxylic acids in a solvent stable to chlorine and preferably in carbon tetrachloride by passing in gaseous chlorine at normal or elevated temperatures. The chlorination may be carried out while irradiating with actinic light or by heating the solution saturated with chlorine in the presence of a catalyst effective as transmitter of halogen, such as iodine.

The chlorine is taken up by substitution of the hydrogen available in the hydrocarbon portion of the dicarboxylic acid treated and with the evolution of an equivalent amount of hydrogen chloride. In this way, both of the carboxylic acid groups remain unchanged. The chlorine substitution, effected in the presence of solvents stable to chlorine, takes place without outside heat addition and with considerable evolution of heat. The reaction may be stopped at any time after the desired chlorine content has been obtained.

Following evaporation of the solvent, the chlorinated dicarboxylic acid is obtained as an oily, highly viscous or solid amorphous substance, non-hygroscopic and stable to air. The chlorine atoms taken up by the carbon portion of the dicarboxylic acid are stable under normal conditions and also remain unchanged in ensuing chemical reactions, which are carried out with the functional carboxylic acid groups.

The C-chlorinated dicarboxylic acids, prepared in accordance with the invention, not only are per se excellent intermediate products in view of their good chemical convertibility, but their salts are also valuable surface-active materials and thus of considerable interest to the pharmaceutical, perfume and soap industries.

From the dicarboxylic acids, chlorinated in accordance with the invention, the corresponding soaps may be produced by conversion with the equivalent amount of an inorganic or organic base. These soaps exhibit excellent foaming qualities. This fact could neither be foreseen nor have been derived from the structure of the soaps. Compounds with long hydrophobic radicals and two hydrophilic groups, the one of them arranged in the center and the other arranged at the end portions of the molecule, are known as foaming agents. This is confirmed, for instance, by the properties of the alkaline salts of a $C_{19}$-α-alkyldicarboxylic acid mixture. However, when the dicarboxylic acid mixture is chlorinated according to the disclosure, water-soluble soaps are obtained which show remarkable foaming properties, and this also in the acid range. The foaming capacity of the non-chlorinated soaps is lowered considerably by any change from the alkaline range to the neutral point of the solution involved and is extremely low in the weak acid range. It is known that the foaming consistency and foaming density, which are both already low in alkaline solutions, will even be lessened in conditions where acidification has taken place.

Therefore it is to be considered most surprising that alkaline salts of the corresponding chlorinated acids in aqueous solution show a very high foaming capacity. It is optimum even in the acid range. The foaming density surpasses that of the non-chlorinated acids in the alkaline range and is still considerably elevated in the acid range. A number of soaps, as produced from dicarboxylic acids chlorinated according to the invention, show good foaming capacities in organic solvents, as for example in hydrocarbons or chlorinated hydrocarbons.

The improvement of the foaming properties of a non-chlorinated acid with the corresponding chlorinated acid is clearly shown in Example 13 (infra). This type of foaming acid solution formed from alkaline salts of dicarboxylic acids is completely exceptional, since, as is well known, the neutral salt of a strong base with a weak acid shows an alkaline reaction in aqueous solution.

The solutions as prepared from the salts of dicarboxylic acids chlorinated according to the invention, change their pH value only slightly at room temperature, and that over several days. A 5% aqueous solution of a soap of this type, adjusted for example to the pH value of 6.65, after 50 hours had a pH value of 6.60 and after 100 hours a pH value of 6.50. Therefore, these solutions represent valuable auxiliary materials for use in the textile and detergent industries and may also serve admirably for the cleansing and regeneration of metallic surfaces.

From the dialkali salt solutions of acids chlorinated according to the invention, the corresponding water-insoluble stable metallic salts may be precipitated, using therefor aqueous metallic salt solutions, as for instance copper, zinc or aluminum salt solutions. This precipitation may also be carried out on textile fibers resulting in their impregnation. The reactive groups of the impregnated salts, as represented by the chlorine, may be utilized in further chemical reactions carried out for improvement or dyeing of the web.

The property of the highly chlorinated acids or of their metallic salts produced therefrom in reducing the inflammability of the materials impregnated therewith is additionally most surprising. This property may be clearly demonstrated, employing a filter paper strip impregnated from mid to the end point thereof which, when ignited at the non-impregnated end, commenced to burn away slowly until the point of impregnation was reached, at which point the flame was extinguished.

The following examples illustrate in greater particularity the method of preparing the various chlorinated dicarboxylic acids. It will be understood that these examples are given for purposes of illustrating preferred processes and are not to be construed as limiting the invention to the processes described therein.

EXAMPLE 1

100 g. nonadecandioic acid were dissolved under heat in 100 cm.$^3$ of carbon tetrachloride, using a round Jena-Glass flask provided with agitator, reflux cooler and gas inlet pipe. The chlorination was effected by passing in gaseous chlorine without heat addition, but under agitation and irradiation with a 500 watt ultra-violet light, until yellowish-green chlorine was clearly seen in the cooler. The solvent was then distilled in vacuum, and finally the residue was recovered by distillation in high vacuum on a water bath at 60° C. The chlorinated product was a white, brittle, amorphous powder having a softening point of about 100° C. The product still contained some carbon tetrachloride which could be isolated and recovered by dissolving the product in methanol and distilling off an azeotropic methanol-carbon tetrachloride mixture. Yield was 302 g. dry substance, showing a chlorine content of 68.4%. The final product consisted of polychloro-nonane-dicarboxylic acid containing 19 gram atoms of chlorine per molecule and having an acid number of 114 (calculated, 114.2).

EXAMPLE 2

20 g. tetradecylglutaric acid were dissolved under heat in 200 cm.$^3$ carbon tetrachloride and then chlorinated without further heat addition substantially as outlined in Example 1. The chlorination product was a white, brittle, amorphous powder with a softening point of about 90° C., still containing carbon tetrachloride. Yield was 68 g. dry substance, showing a chlorine content of 71.9%. The final product consisted of polychloro-α-tetradecyl-glutaric acid containing 22.1 gram atoms of chlorine per molecule and having an acid number of 102 (calculated, 10.7).

EXAMPLE 3

30 g. tricyclodecane-(5,2,1,0$^{2,6}$)-dicarboxylic acid-(4,8) were suspended in 250 cm.$^3$ carbon tetrachloride, heated and then chlorinated without further heat addition and worked up as described in Example 1. The chlorinated product was a white, brittle, amorphous powder with a softening point of about 130° C. and still contained carbon tetrachloride. Yield of dry substance was 63.5 g., showing a chlorine content of 54.2%. The final product consisted of polychloro-tricyclodecane-(5,2,1,0$^{2.6}$)-dicarboxylic acid-(4.8) containing 7.3 gram atoms of chlorine per molecule and having an acid number of 226 (calculated, 236.7).

EXAMPLE 4

100 g. of an oily $C_{19}$-α-alkyldicarboxylic acid mixture, as prepared by hydroformylation of oleic acid, hydrogenation and subsequent alkaline fusion, were dissolved in 500 ccm. carbon tetrachloride and chlorinated by the procedure as outlined in Example 1. Within an hour's time, 15 liters of chlorine gas were passed into the solution. Without additional heating the temperature of the reaction mixture was raised to the boiling point of the solvent. Subsequently, the solvent was distilled off and the remaining solvent was removed in high vacuum on a water bath of 60° C. In this way, 119 g. of residue was recovered as a yellowish, clear, oily liquid having a chlorine content of 16.4%. The final product consisted of a polychloro-$C_{19}$-α-alkyldicarboxylic acid mixture containing 1.9 gram atoms of chlorine per molecule and having an acid number of 287 (calculated, 287.7).

EXAMPLE 5

A solution in 500 ccm. carbon tetrachloride of 100 g. of the $C_{19}$-α-alkyldicarboxylic acid mixture, as employed in Example 4, was treated with 52.5 liters of chlorine gas over a period of 3.5 hours and worked up accordingly. 173 g. of a yellowish, clear product, just about in the liquid state at room temperature, was obtained having a chlorine content of 43.1%. The final product consisted of a polychloro-$C_{19}$-α-alkyldicarboxylic acid mixture containing 6.9 gram atoms of chlorine per molecule and having an acid number of 198 (calculated, 198.5).

EXAMPLE 6

A solution of 100 g. of the $C_{19}$-α-alkyldicarboxylic acid mixture, employed in Example 4, in 500 ccm. carbon tetrachloride was treated with 82 liters of chlorine gas over a period of 5.5 hours under conditions substantially as outlined above and then worked up in the same way. The residue was a white, brittle, amorphous powder having a softening point of about 70° C. The powder still contained carbon tetrachloride, which was removed as outlined in Example 1. Yield of dry product was 214 g., showing a chlorine content of 54.3%. The final product consisted of polychloro-$C_{19}$-α-alkyldicarboxylic acid mixture containing 10.7 gram atoms of chlorine per molecule and having an acid number of 161 (calculated, 161.2).

EXAMPLE 7

Chlorine gas was passed into a solution of 100 g. of a $C_{19}$-α-alkyldicarboxylic acid mixture in 500 ccm. carbon tetrachloride, as employed in Example 4, for such a period of time and under such conditions as outlined in Example 1 until yellowish green chlorine was clearly shown in the reflux cooler. The reaction mixture was worked up by distillation. The chlorination product was a white, brittle, amorphous powder with a softening point of about 120° C. It still contained carbon tetrachloride which was removed by the procedure described in Example 1. Yield of dry substance was 268 g. showing a chlorine content of 64.0%. The final product consisted of polychloro-$C_{19}$-α-alkyldicarboxylic acid mixture containing 15.7 gram atoms of chlorine per molecule and having an acid number of 129 (calculated, 129.2).

EXAMPLE 8

100 g. of a $C_{19}$-α-alkyldicarboxylic acid mixture, employed according to Example 4, were chlorinated under conditions as outlined in Example 7, differing only in that a quartz vessel was used. The while, brittle, amorphous powder obtained showed a softening point of 125° C. It still contained carbon tetrachloride which was removed according to Example 1. Yield of dry substance was 286 g., showing a chlorine content of 66.6%. The final product consisted of a polychloro-$C_{19}$-α-alkyldicarboxylic acid mixture containing 17.5 gram atoms of chlorine per molecule and having an acid number of 120 (calculated, 120.5).

EXAMPLE 9

Following the addition of 150 mg. iodine at room temperature, a solution of 100 g. C-chlorinated $C_{19}$-α-alkyldicarboxylic acid mixture obtained according to Example 7 in 700 ccm. carbon tetrachloride was saturated with chlorine in a closed fusion tube for 8 hours at 120° C. After cooling, the solution was again saturated with chlorine gas, the hydrogen chloride gas formed was driven off and the same treatment repeated at 135° C., 150° C., 160° C. and 170° C. The solution obtained was then subjected to a post-chlorination at normal pressure, employing ultra-violet radiation and worked up according to Example 1. Yield was 117 g. of a product having a chlorine content of 69.4%. The final product consisted of a polychloro-$C_{19}$-α-alkyldicarboxylic acid mixture containing 19.7 gram atoms of chlorine per molecule and having an acid number of 110 (calculated, 111.2).

EXAMPLE 10

100 g. of the C-chlorinated $C_{19}$-α-alkyldicarboxylic acid mixture, as obtained according to Example 7, were dissolved in 700 ccm. benzene and neutralized with an approximate 1-N solution of sodium hydroxide in methanol. After evaporation of the solvent and drying of the residue, employing high vacuum, the disodium salt of the C-chlorinated $C_{19}$-α-alkyldicarboxylic acid mixture was recovered as a solid, hard substance having a melting point of between 165 and 172° C. and containing 61.1% chlorine.

EXAMPLE 11

50 ccm. ($V_A$) each of a 1% aqueous solution of the disodium salt obtained according to Example 12 were adjusted to pH values of 8.5, 8.0, 7.5, 7.0, 6.5, 6.0 and 5.5 and brought to the foaming state at 20° C. in a 250 ccm. measuring flask by uniform agitation for ½ minute of a perforated plate and the respective solvent ($V_{L1}$ resp. $V_{L30}$) and foaming volume ($V_{S1}$ resp. $V_{S30}$) checked in values of cm.³ after 1 and after 30 minutes. On the basis of these values, the foaming numbers were calculated after 1 ($S_{Z1}$) and 30 minutes ($S_{Z30}$), the foaming consistency ($S_B$) and the foaming density after 1 ($S_{D1}$) and after 30 minutes ($S_{D30}$).

Foaming number:

$$S_{Z1} = \frac{V_{S1} \cdot 100}{V_A} \qquad S_{Z30} = \frac{V_{S30} \cdot 100}{V_A}$$

Foam consistency:

$$S_B = \frac{V_{S30}}{V_{S1}}$$

Foam density:

$$S_{D1} = \frac{V_A - V_{L1}}{V_{S1}} \qquad S_{D30} = \frac{V_A - V_{L30}}{V_{S30}}$$

A similar test was conducted, employing the disodium soap of the non-chlorinated acid, the results being listed in the following table, as medium values each representing 10 determinations.

Table I

[Foaming numbers, foaming consistencies and foaming densities of sodium soaps of a C-chlorinated $C_{19}$-$\alpha$-alkyldicarboxylic acid according to Example 10, in comparison to the corresponding non-chlorinated acid at various pH values and in comparison of two other washing substances]

| pH | $S_{ZI}$ | $S_{Z30}$ | $S_{D1}$ | $S_{D30}$ | $S_B$ | |
|---|---|---|---|---|---|---|
| 8.5 | 480 | 391 | 0.193 | 0.028 | 0.815 | The di-sodium salt of a polychloro-$C_{19}$-$\alpha$-alkyldicarboxylic acid mixture containing 15.7 gram atoms of chlorine per molecule. |
| 8.0 | 470 | 381 | 0.195 | 0.030 | 0.810 | |
| 7.5 | 478 | 380 | 0.198 | 0.030 | 0.798 | |
| 7.0 | 495 | 405 | 0.200 | 0.031 | 0.818 | |
| 6.5 | 495 | 420 | 0.200 | 0.035 | 0.841 | |
| 6.0 | 483 | 410 | 0.201 | 0.055 | 0.852 | |
| 5.5 | 420 | 357 | 0.211 | 0.080 | 0.840 | |
| 8.5 | 450 | 320 | 0.190 | 0.001 | 0.711 | The di-sodium salt of a $C_{19}$-$\alpha$-alkyldicarboxylic acid mixture without chlorine. |
| 8.0 | 463 | 331 | 0.190 | 0.001 | 0.713 | |
| 7.5 | 471 | 342 | 0.190 | 0.001 | 0.720 | |
| 7.0 | 463 | 336 | 0.192 | 0.002 | 0.720 | |
| 6.5 | 400 | 255 | 0.200 | 0.003 | 0.630 | |
| 8.5 | 452 | 352 | 0.195 | 0.010 | 0.781 | N-oleyl-aminobutane-sulfonic sodium-salt (Trade Name "Ercepon"). |
| 8.0 | 452 | 360 | 0.195 | 0.010 | 0.780 | |
| 7.5 | 452 | 359 | 0.195 | 0.010 | 0.780 | |
| 7.0 | 443 | 349 | 0.195 | 0.010 | 0.799 | |
| 6.5 | 438 | 342 | 0.196 | 0.010 | 0.799 | |
| 6.0 | 433 | 337 | 0.197 | 0.010 | 0.798 | |
| 5.5 | 430 | 332 | 0.197 | 0.010 | 0.798 | |
| 8.5 | 410 | 263 | 0.207 | 0.009 | 0.641 | N-methyl-$\alpha$-olein-aminoethane-sulfonic-sodium-salt (Trade Name "Hostapon"). |
| 8.0 | 410 | 270 | 0.206 | 0.008 | 0.657 | |
| 7.5 | 410 | 276 | 0.205 | 0.008 | 0.671 | |
| 7.0 | 410 | 281 | 0.204 | 0.008 | 0.681 | |
| 6.5 | 411 | 288 | 0.203 | 0.008 | 0.689 | |
| 6.0 | 412 | 288 | 0.202 | 0.008 | 0.692 | |
| 5.5 | 413 | 289 | 0.202 | 0.008 | 0.692 | |

EXAMPLE 12

From the aqueous solution of the disodium salt of the C-chlorinated $C_{19}$-$\alpha$-alkyldicarboxylic acid mixture obtained according to Example 10, the corresponding copper salt was precipitated as a flaky precipitate, employing therefor a copper sulfate solution. It was purified by suction and by washing in water, which was repeated several times. Then it was sharply sucked off and dried in a vacuum desiccator. The blue copper salt of the polychloro-$C_{19}$-$\alpha$-alkyldicarboxylic acid mixture showed a melting range of 209–214° C. and a chlorine content of 59.5%.

EXAMPLE 13

According to the procedure described in Example 12, using aqueous zinc chloride solution, the white zinc salt of a polychloro-$C_{19}$-$\alpha$-alkyldicarboxylic acid mixture was obtained. The melting range was 170–174° C., and the chlorine content was 59.4%.

EXAMPLE 14

100 grams of adipic acid were suspended in 650 ccm. carbon tetrachloride and chlorinated as described above while being irradiated with actinic light. After evaporation of the solvent, 183 grams (calculated, 181 grams) of polychloradipic acid containing 3.4 gram atoms of chlorine per molecule were obtained as a yellowish solid substance having a softening point of about 120° C., a chlorine content of 46.0% and an acid number of 423 (calculated, 424.5).

EXAMPLE 15

20 grams of cetylmalonic acid were suspended in 200 ccm. of carbon tetrachloride and treated with gaseous chlorine while irradiating with the light of a mercury vapor lamp. After having driven off the solvent, 63 grams (calculated, 61.05 grams) of polychloro-cetylmalonic acid containing 19.6 gram atoms of chlorine per molecule were obtained as a white substance having a softening point of 85° C., a chlorine content of 69.2%, and an acid number of 103 (calculated, 109.5).

EXAMPLE 16

100 grams of solid terpanedicarboxylic acid having the empirical formula $C_{12}H_{20}O_4$ were suspended in 600 ccm. carbon tetrachloride and chlorinated in the manner described above. After having driven off the solvent, 232 grams (calculated, 228.5) of polychloroterpanedicarboxylic acid containing 8.5 gram atoms of chlorine per molecule were obtained as a white substance having a softening point of 92° C., a chlorine content of 57.9% and an acid number of 206 (calculated, 215.0).

EXAMPLE 17

100 grams of liquid terpanedicarboxylic acid having the empirical formula $C_{12}H_{20}O_4$ were dissolved in 600 ccm. of carbon tetrachloride and chlorinated with gaseous chlorine in the manner described above. After evaporation of the solvent, 260 grams (calculated, 247.5) of polychloroterpanedicarboxylic acid containing 9.8 gram atoms of chlorine per molecule were obtained as a white substance having a softening point of 78° C., a chlorine content of 61.4%, and an acid number of 188 (calculated, 198.5).

EXAMPLE 18

20 grams of polychloro-$C_{19}$-$\alpha$-alkyldicarboxylic acid mixture containing 15.7 gram atoms of chlorine per molecule (see Example 7) were dissolved in 140 ccm. carbon tetrachloride, mixed with 30 milligrams of iodine, and the solution which was saturated with gaseous chlorine was heated for 6 hours at 120° C. in a sealed tube. Upon cooling, the solution was again saturated with gaseous chlorine. Hydrogen chloride formed thereby was driven off and the same operation carried out at 150, 160, and 170° C. Following this, the product was worked up, resulting in 19.6 grams (calculated, 20.4 grams) polychloro-$C_{19}$-$\alpha$-alkyldicarboxylic acid mixture containing 16.2 gram atoms of chlorine per molecule and having a chlorine content of 64.8%, a softening point of 122° C. and an acid number of 125.7 (calculated, 126.6).

The chlorination of other dicarboxylic acids according to the process of the invention was effected in that the acid to be chlorinated was dissolved or suspended in carbon tetrachloride and chlorinated without further addition of heat in a flask provided with agitator, reflux cooler and inlet tube for chlorine by passing in gaseous chlorine under agitation and irradiation with a 500 watt ultraviolet lamp of the Quarzlampen G.m.b.H., Hanau (Main), Germany. In order to assure complete chlorination, chlorine gas was passed in for such length of time that yellowish green chlorine showed up in the cooler. In case a definite stage of chlorination was to be reached, the chlorine volume to be passed in was then checked by dosing, using a flowmeter. After the chlorination was completed, the solvent was first distilled off in vacuum and the chlorination product was finally dried in high vacuum, using a water bath at 60° C.

The amounts of chlorine taken up in the chlorination of some dicarboxylic acids according to the invention are shown in the following table:

*Table II*

| Acid | In CCl$_4$ | Average Cl/mol taken up |
|---|---|---|
| Cetylmalonic acid | Suspended | 19 |
| α-tetradecylglutaric acid | Dissolved | 18 |
| Adipic acid | Suspended | 3.5 |
| Nonadecandioic carboxylic acid | Dissolved | 18 |
| Tricyclodecane-(5,2,1,0$^{2,6}$)-dicarboxylic acid-(4,8). | Suspended | 7 |
| Terpane dicarboxylic acid, solid | do | 9 |
| Terpane dicarboxylic acid, liquid | Dissolved | 10 |

The chlorinated dicarboxylic acids, as prepared according to the invention, represent oily or high-viscous substances when small amounts of chlorine are taken up. Solids are obtained when large amounts of chlorine are taken up. This fact is shown in the following table, specific with respect to the chlorination products of a C$_{19}$-α-alkyldicarboxylic acid mixture:

*Table III*

| Product No. | Condition | Cl, percent | Acid number | Cl, per mol | Softening point at about— |
|---|---|---|---|---|---|
| 1 | Yellow, transparent, oily. | 13.9 | 289 | 1.6 | |
| 2 | Yellow, transparent, viscous. | 38.9 | 193.8 | 6.5 | |
| 3 | Yellow, transparent, extremely high-viscous. | 43.3 | 183.8 | 7.6 | |
| 4 | White, amorphous, brittle, containing CCl$_4$. | 52.6 | 167.2 | 10.0 | 70° C. |
| 5 | After drying in high vacuum at 140° C. | 59.0 | 146.1 | 12.8 | 95° C. |
| 6 | Slightly yellowish | 62.6 | 134.9 | 14.6 | 115° C. |

We claim:

A foam-improving agent consisting essentially of a water-soluble sodium salt of a chlorinated C$_{19}$-α-alkyldicarboxylic acid prepared by reacting a solution of a C$_{19}$-α-alkyldicarboxylic acid with chlorine in carbon tetrachloride as solvent, recovering the chlorinated dicarboxylic acid thereby formed and saponifying said chlorinated dicarboxylic acid with sodium hydroxide to produce the corresponding sodium salt.

References Cited in the file of this patent

UNITED STATES PATENTS

| 2,578,656 | Kolka et al. | Dec. 18, 1951 |
| 2,807,579 | Molotsky et al. | Sept. 24, 1957 |
| 2,905,711 | Novak et al. | Sept. 22, 1959 |

FOREIGN PATENTS

| 336,623 | Great Britain | Oct. 15, 1930 |